Jan. 17, 1956

C. YEOMANS 2,730,961

CONTROL SYSTEM

Filed Oct. 30, 1952

Inventor:
Charles Yeomans
By: Soans, Pointer & Anderson
Attys.

Jan. 17, 1956  C. YEOMANS  2,730,961
CONTROL SYSTEM
Filed Oct. 30, 1952  6 Sheets-Sheet 5

Inventor:
Charles Yeomans
By: Soans, Glaister & Anderson
Attys.

United States Patent Office 2,730,961
Patented Jan. 17, 1956

2,730,961

CONTROL SYSTEM

Charles Yeomans, Hubbard Woods, Ill., assignor to Yeomans Brothers Company, Chicago, Ill., a corporation of Delaware Application October 30, 1952, Serial No. 317,717

10 Claims. (Cl. 103—238)

This invention relates generally to control systems for gas displacement type ejectors and more particularly to a control system for effecting the automatic operation of an ejector installation which comprises a plurality of interconnected gas displacement type ejectors.

The present invention is a continuation-in-part of my copending application Serial No. 118,544, Control System, filed September 29, 1949, now Patent No. 2,644,405. The aforementioned application is concerned with an interlocking automatic control arrangement for a multiple ejector installation which prevents the simultaneous discharge of more than one of the ejector units, and which, at the same time, permits sewage influx into the receiver of any of the ejector units which is not then discharging. This mode of operation is accomplished by the provision of an interlocking valve means which is interconnected in the main air line of the control system for the ejectors so as to regulate the flow of air to and from the ejectors in a manner whereby automatic filling and discharge operations of each ejector is effected in a predetermined manner.

It is the principal object of the present invention to provide a novel arrangement of interlocking valve means in the control system disclosed in the above-mentioned copending application. More particularly, it is an object of this invention to provide for the use of interlocking valve means in the relatively small diameter pilot lines of the multiple ejector control system, whereby a more economical control system may be provided through the use of smaller, less expensive valves.

In the drawings:

Figures 2 and 3 are sectional views of the structure shown in Figure 1, showing in detail certain of the various operating positions of the control equipment during the operating cycles of the ejectors;

Figures 4, 5 and 6 are cross-sectional views of the pilot valves used to effect general control of the operation of each of the ejector units in response to changes in the level of the material contained in the receiver;

The duplex pneumatic ejector system illustrated in Figures 1 to 6, inclusive, of the drawings includes a pair of ejector units 10 and 12 which are connected to a common sewage feed line (not shown) and to a common sewage discharge line 14. The discharge line 14 may, in turn, be connected to a main sewer or other disposition point in the usual manner. Each of the ejector units is of the same construction and, consequently, only one, the unit 10, will be described in detail. The elements of the unit 12 will be designated by the same reference numerals as the corresponding elements in unit 10 with the addition of the symbol prime (').

The ejector unit 10 includes a receiver 16 having at its lower portion an inlet conduit extension 18 and an outlet conduit extension 20 which are provided with diaphragm control valves 22 and 24, respectively. These valves are conventional type valves having a spring biased diaphragm connected on one side to a valve plunger, movable to open or close the pipe line controlled thereby, and connected on the other side to an air conduit. The inlet extension 18 of the receiver 16 is connected to the common feed line (not shown) through the diaphragm type valve 22 and a pipe line 26, and the outlet extension 20 is connected to the common discharge line 14 through the similar valve 24 and a pipe line 28. Although not shown in the illustrated embodiment, suitable shut-off valves may be provided in the pipe line 26 between the common intake line and the diaphragm valve 22 and in the pipe line 28 between the common discharge line 14 and the diaphragm valve 24.

The upper end of the ejector receiver 16 is provided with an air conduit extension 30 which is connected by a pipe line 34 to a valve mechanism 32, which is operable to selectively vent the receiver 16 to the atmosphere or supply it with compressed air. The valve mechanism 32 includes a housing 36 having an inlet port 38 which is connected to a source of pressure air by a pipe line 40, an exhaust port 42 which is connected to the atmosphere by an exhaust line 44, and a third port 46 communicating with the receiver 16 through the pipe line 34. The interior of the valve housing 36 is so designed that a movable valve plunger 48 may either close exhaust port 42, to provide communication between the inlet port 38 and the port 46 to the receiver, or close inlet port 38 and permit communication between the receiver and the exhaust line 44 through the pipe line 34, port 46, and exhaust port 42.

The valve mechanism 32 is a diaphragm-type valve with the plunger 48 being carried at the end of a valve stem 50 which extends through a suitable air-tight opening in the housing 36 and is connected to a diaphragm 52. The diaphragm 52 is yieldingly supported on the valve housing 36 by a spring 54, and the side of the diaphragm opposite the valve stem 50 communicates with an air conduit or pipe 56 provided to supply regulated air pressure on the diaphragm to thereby move the plunger 48 to a selected one of its two positions. The valve mechanism 32' for the ejector unit 12 operates in the same manner.

Control of the valve mechanism 32, as well as the inlet and outlet valves 22 and 24, respectively, is effected automatically by means which is responsive to the liquid level in the receiver 10. Broadly, this means comprises a pilot valve 58, shown in detail in Figures 4–6, having a slidable control member 60 controllably connected with oppositely facing bells 62 and 64 disposed within the receiver 16. The bells 62 and 64 are arranged so that the weight of the liquid in the lower bell 64 will move the control member 60 in one direction, while air trapped in the downwardly facing bell 62, as the level of the material in the receiver 16 rises, will cause the control member 60 of the pilot valve 58 to move in the opposite direction.

The bells 62 and 64 in the receiver 16 are supported in vertically spaced relation by a rod 66 which extends upwardly through a suitable stuffing box 68 in the top of the receiver. The upper end of the rod is pivotally connected, by means of a link 70, to one end of a lever 72 which is provided with a counterweight 74. An intermediate portion of the lever 72 is fixed to a horizontally extending pivot member 76 rotatably supported in the lower housing portion 78 of the pilot valve 58. Also fixed to this pivot member 76 is an arm 80 which extends upwardly into the upper housing portion 82 of the pilot valve for pivotal connection with the control member 60. The upper housing 82 of the pilot valve 58 includes a chamber 84, in which is supported the slidable air control member 60, and a port 85 providing connection with a pipe line 86 leading to a suitable source of air pressure (not shown).

The lower housing portion 78 provides a seat for the slidable control member 60 and includes a pair of bores 88 and 90 which extend between the chamber 84 and a pair of pipe lines 92 and 94, respectively. The location of the bores 88 and 90 and the dimensions of the control member 60 are such that movement of the latter to either one of its operative positions will open one of the bores to the chamber 84 and permit the other of the bores to communicate with the atmosphere through a space 96 provided between the central portion of the member 60 and the seat therefor.

The pipe line 92, which is connected at one end to the bore 88 in the pilot valve 58, communicates directly with the diaphragm of the sewage inlet valve 22. The pipe line 94, leading from the bore 90 in the housing of pilot valve 58, terminates in a cross-coupling providing communication with a pipe line 98 leading to the diaphragm of the sewage outlet valve 24, a pipe line 56 leading to the diaphragm of the air control valve 32, and with a pipe line 102 having communication with a pair of interlocking valves in the system in a manner to be described.

The interlocking control for the illustrated duplex ejector units 10 and 12 comprises, generally, a pair of diaphragm valves 104 and 106 which are disposed in the pilot lines 92' and 94', respectively, leading from the pilot valve 58' of the unit 12 to the sewage inlet and outlet control valves 22' and 24', respectively. These interlocking valves 104 and 106 are diaphragm-type valves, similar in design to the air control valve 32 described above. However, it is to be noted that, since the interlocking valves 104 and 106 are connected only to the pilot lines in the system and are not involved in the large main air lines, these interlocking valves are relatively small and inexpensive as compared with valves needed to control the flow of pressure air from the source to the ejector unit. Further, the interlocking valves 104 and 106 may be placed at a distance from the ejector units, if desired, inasmuch as they are connected in the system through small tubing or pipe which can be conveniently handled and extended at relatively small expense.

The interlocking valve 104 on the sewage inlet side of the ejector unit 12 has three ports 110, 112 and 114 communicating, respectively, with the diaphragm of inlet valve 22', with the pipe line 92' leading to the bore 88' in the pilot valve 58', and with a pipe line 116 communicating with the pressure air pipe line 86'.

The interlocking valve 106 is disposed on the sewage outlet side of the ejector unit 12 and has three ports 118, 120 and 122 communicating, respectively, with the diaphragms of inlet valve 24' and air control valve 32' through the pipe lines 98' and 56', with the pipe line 94' leading to the bore 90' in the pilot valve 58' and directly with the atmosphere.

The diaphragm portion of the interlocking valves 104 and 106 is in communication with each other through an interconnecting pipe line 124, and with the pipe line 102 which is an extension of the line 94 leading from the bore 90 of the pilot valve 58. The spring biased diaphragm of the interlocking valves is normally positioned with the valve piston or plunger 126 seated to close off the ports 114 and 122 of the valves 104 and 106, respectively. However, upon application of air pressure through lines 102 and 124, the diaphragms will move against the resistance of their respective springs to move the plungers downwardly to shut off ports 112 and 120. In this latter position of the valve plungers there is permitted a flow of air through the valve 104 between ports 114 and 110 and a flow through the valve 106 between the port 118 and the port 122 which is open to the atmosphere.

*Operation*

Having in mind the above described arrangement of parts and the details of the various elements of the system illustrated in Figures 1–6, the operation of this system will now be described. Assuming that both of the ejector units 10 and 12 are empty, the bells 62 and 64, and 62' and 64', will be in their lowermost position in the respective receivers 16 and 16' due to their own weight. This position of the bells places the control members 60 and 60' of the pilot valves 58 and 58', respectively, in the position relative to the bores 88 and 88' that is shown in Figure 4. Compressed air will then flow from the common source (not shown) through the pipe lines 86 and 86' into the chambers 84 and 84' and then through the bores 88 and 88' into the lines 92 and 92'.

Figures 1, 11:
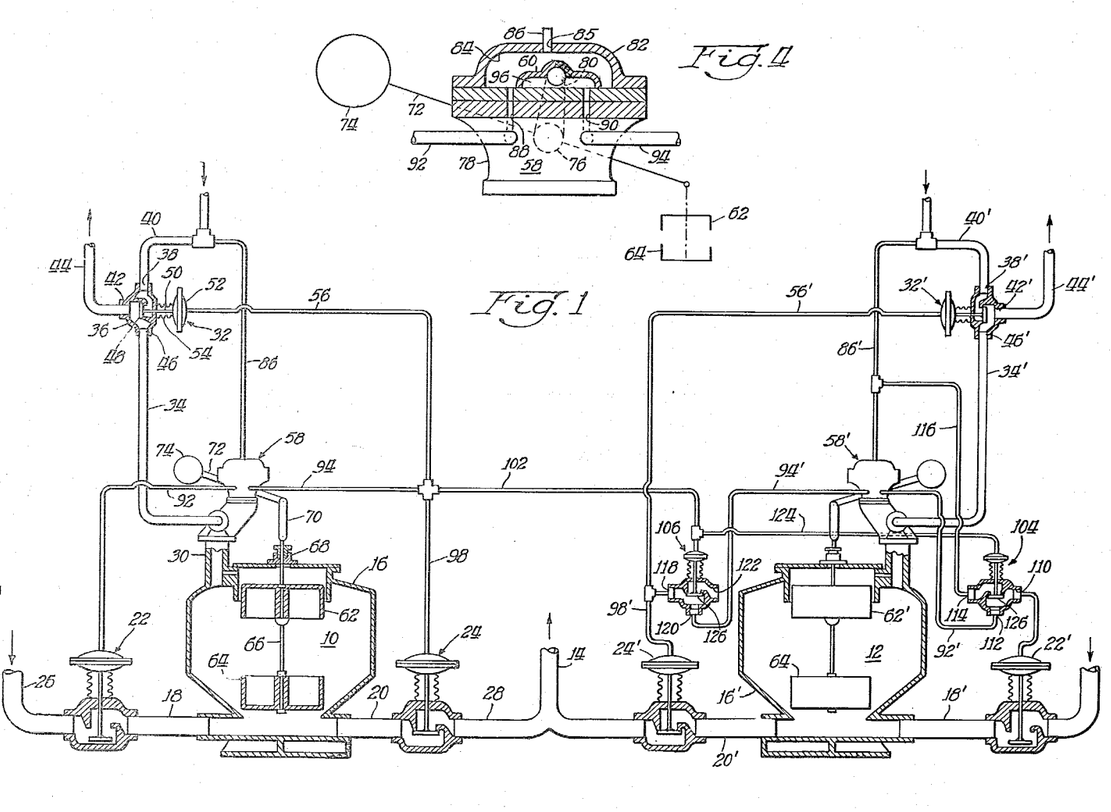
Figure 1 is a sectional view of a duplex, pneumatic ejector unit which includes an automatic control system in accordance with the invention.

Referring first to the ejector unit 10, the air pressure in pipe line 92 will act on the diaphragm of the inlet valve 22 to move the plunger downwardly and thus permit the sewage or other material to be pumped to flow through the pipe 26 and the inlet 18 into the receiver 16. Since the control member 60 has been moved as described above to place the bore 90 in communication with the atmosphere through the space 96, the pipe line 94 and all pipe lines communicating therewith will be vented to the atmosphere. Consequently, the diaphragm of the valve 24, at the discharge side of the receiver will be vented through pipes 98 and 94, and the plunger of this valve will be in a position blocking the flow of material from the receiver outlet 20 to the common outlet 14 (Figure 1).

The diaphragm of the air control valve 32 will be vented through the pipe lines 56 and 94 and, consequently, the valve plunger 48 will be in its normal position closing port 38 and placing port 46 in communication with the exhaust line 44 via the port 42. This permits air to escape from the receiver 16 through the pipe line 34 and allows the receiver to fill with the incoming sewage.

At the same time, the diaphragms of the interlocking valves are vented to the atmosphere through the pipe lines 124, 102 and 94 and the bore 90 of the pilot valve 58. This places the valves 104 and 106 in their normal position wherein port 114 in valve 104 and port 122 in valve 106 are closed. With the interlocking valves thus disposed and the pilot valve 58' of the ejector unit 12 in the same position described above with respect to valve 58, the pressure air entering through the pipe line 86' enters the pilot valve chamber 84' whence it is directed through the bore 88' and the pipe 92' into the port 112 of the interlocking valve 104. The plunger 126 of the valve 104, being in its normal, raised position (Figure 1) allows the pressure air to flow through the port 110 to the diaphragm of the sewage intake control valve 22'. The pressure thereby exerted on the diaphragm of the valve 22' moves the valve plunger downwardly to open the valve and allow sewage to flow from the intake line 26' into the inlet 18' of receiver 16'.

The other interlocking valve 106, having its diaphragm also vented and the port 122 closed, provides means for venting of the diaphragms of the sewage discharge valve 24' and the air control valve 32' to the atmosphere. The air in lines 56' and 98' flows through the ports 118 and 120 of the valve 106 to the line 94' and then through the bore 90' and the space 96' in the pilot valve 58' to the atmosphere, to thereby vent the diaphragms of the valves 24' and 32'.

The venting of the diaphragm of the valve 32' causes the the plunger to move to the position (Figure 1) wherein port 38' is closed and ports 46' and 48' are open to permit air to escape from the receiver 16' through pipe line 34' to the exhaust line 44'. Thus the receiver 16' is in condition for taking in sewage through the pipe line 26' and inlet 18'.

As the level of the sewage in the receivers 16 and 16' rises to the level of the upper bells 62 and 62', respectively, the air trapped within the bells will force them upwardly thereby moving the associated rods 66 and 66' upwardly to effect a shifting in the control members 60 and 60' of the pilot valves 58 and 58'.

Figures 2, 5:
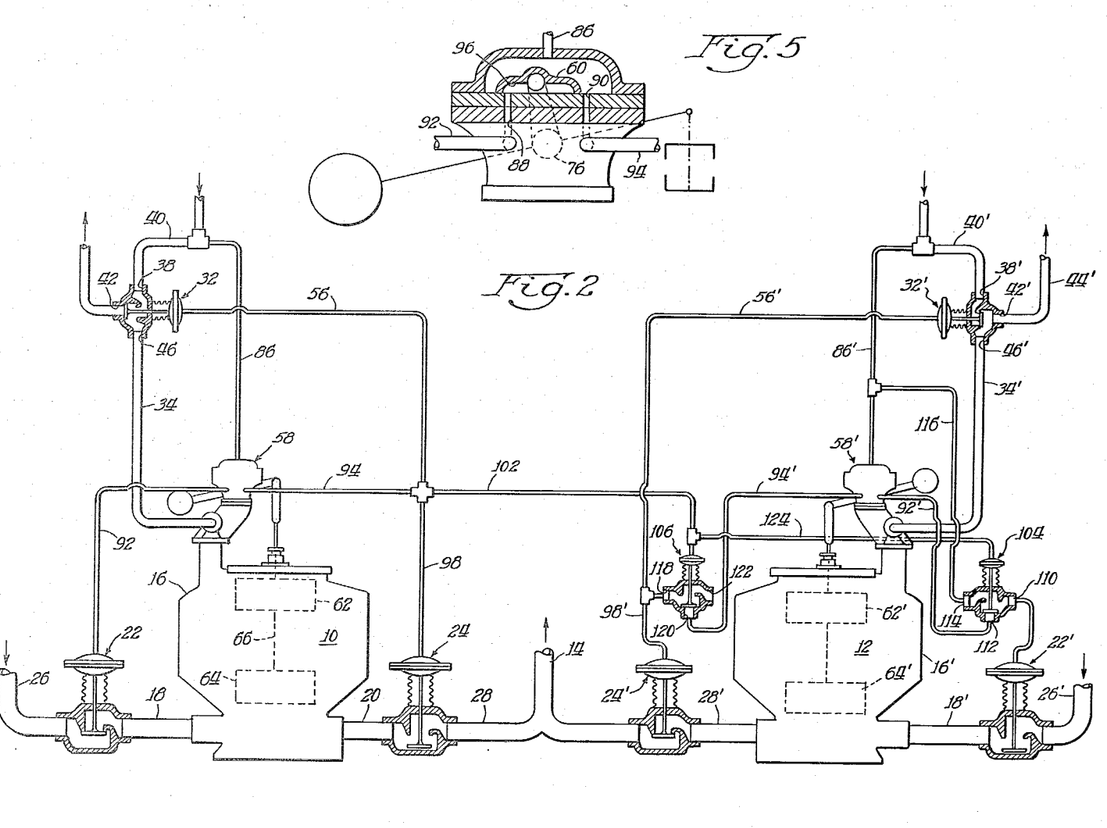

Assuming that the receiver 16 is filled first, the upward movement of the rod 66 will be transmitted through the link 70 and the lever 72 to rotate the pivot member 76 and thereby move the control member 60 to the left, from the position illustrated in Figure 4 to the position shown in Figure 5. The pressure air in the pipe line 86 now flows through the bore 90 into the pipe line 94 and thence to the three branch lines 98, 56 and 102 which communicate with the pipe 94 (Figure 2.) The pressure in the line 98 will cause the plunger of the sewage outlet control valve 24 to move downwardly, placing the receiver outlet 20 in communication with the outlet pipe 28. The pressure in the line 56 will cause the plunger 48 of the air control valve 32 to move to the left, as shown in Figure 2, thereby blocking the exhaust port 42 and placing the pipe line 34 to the receiver in communication with the air pressure line 40.

It will further be noted in Figure 5, that the bore 88 is now in communication with the atmosphere through the space 96 underlying the control member 60 and, consequently, the diaphragm of the intake control valve 22 will be relieved of pressure through the line 92 and the plunger will therefore move upwardly to block communication between the intake pipe 26 and the receiver 16.

Thus it is seen that the receiver 16 is open on the discharge side at outlet 20 and is receiving pressure air through the line 34 to expel the material in the receiver through the outlet 20 and pipe 28 into the common discharge conduit 14.

The air pressure which is directed into the pipe line 102, by the above described shifting of the pilot valve control member 60, acts on the diaphragms of the interlocking valves 104 and 106 but does not disturb the filling of the second receiver 12. The pressure exerted on the diaphragm of the valve 106, of course, causes the plunger to move downwardly to a position blocking the port 120 (Figure 2) and venting the pipe lines 98' and 56' through the ports 118 and 122 of the valve 106 directly to the atmosphere. Consequently, the discharge valve 24' and the air control valve 32' are maintained in their normal positions with the diaphragms extended, as seen in Figure 2.

The air pressure which is carried from the line 102 through the pipe line 124 to the other interlocking valve 104 similarly causes a distortion of the diaphragm resulting in a downward movement of the plunger 126. Port 112 is thereby blocked, but the ports 114 and 110 are placed in communication with each other to permit air pressure from line 86' to flow through the branch pipe line 116 and the valve 104 to the diaphragm of intake valve 22' to maintain the latter valve in its open position allowing material to continue flowing into the receiver 16'. Since the bell 62' has not moved upwardly to its pilot valve shifting position, the pilot valve 58' remains unchanged from the position described with respect to Figure 1.

Thus it is seen that the receiver 16' continues to fill, while the receiver 16 is discharging material into the outlet pipe 14.

Figures 3, 6:
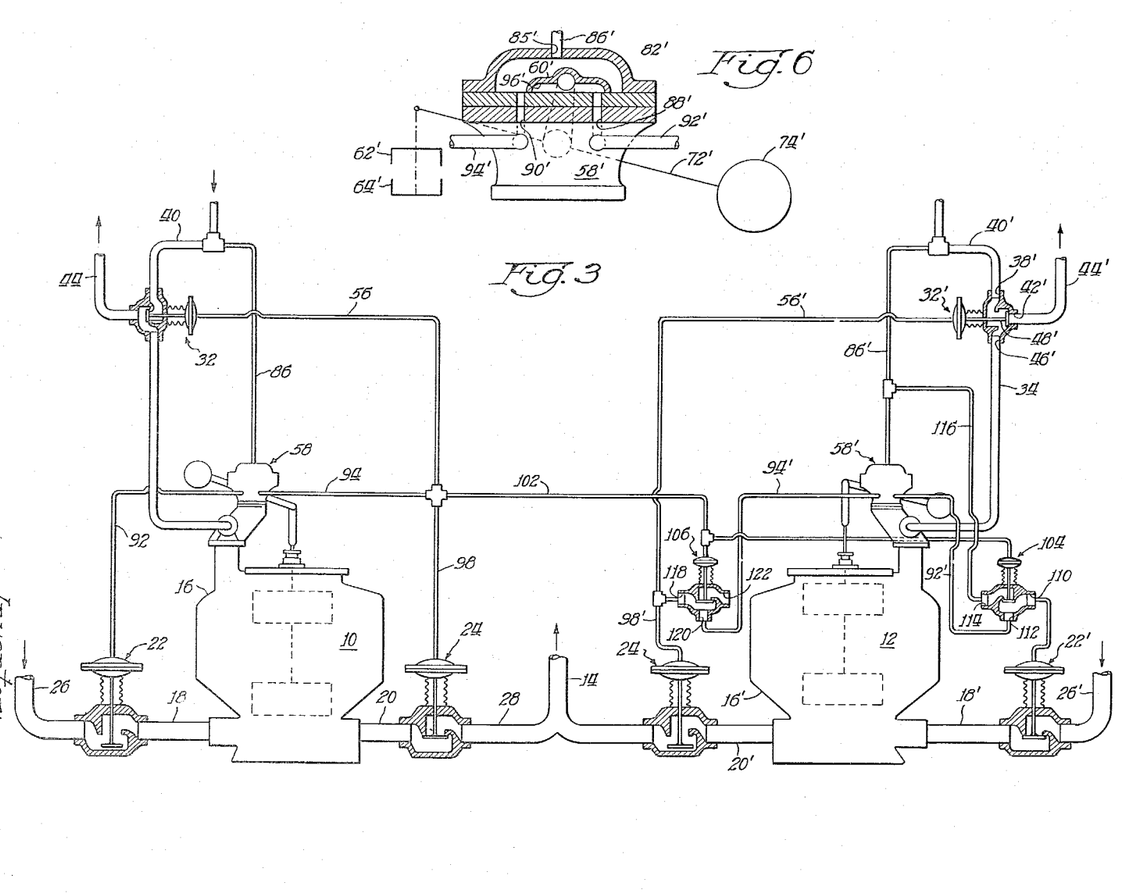

As the sewage level in the receiver 16 is forced by the air pressure therein to a point below the level of the lower bell 64, the weight of the sewage trapped in the bell will move the rod 66 downwardly sufficient to effect a shifting of the pilot valve control member 60 back to the right (Figure 4), thereby directing the pressure air in line 86, as indicated in Figure 3, to open the intake valve 22, and allowing the pressure air in the line 98 to be vented through the pilot valve 58 and thereby close the discharge valve 24, to permit sewage to enter the receiver 16.

When the receiver 16' of the ejector unit 12 is filled, the control member 60' of pilot valve 58' is moved to the right, as shown in Figure 6, by virtue of the upward movement of the upper bell 62' in the receiver. Assuming that the receiver 16 is filling (Figure 3), the pipe line 102 will be vented to the atmosphere through the line 94 and the pilot valve 58. Consequently, the diaphragms of the interlocking valves 104 and 106 will be relieved of pressure and the valve plunger will block the port 114 and open communication between ports 110 and 112. In valve 106 the plunger will block the port 122 and open ports 118 and 120.

Accordingly, the pressure air in the pipe line 86' will flow into the pilot valve 58' and then through the bore 90' and pipe 94' into the port 120 of the interlocking valve 106. From the valve 106 air will flow through the port 118 to the diaphragms of valves 24' and 32' through the lines 98' and 56'. The pressure air thus directed will cause the sewage discharge valve 24' to open communication between the receiver 16' and the common outlet pipe 14, and will effect a movement of the plunger 48' of the air control valve 32' to block the exhaust port 42' and open communication between the ports 38' and 46'. The latter action places the branch pressure air line 40' in communication, through pipe line 34', with the receiver 16'.

The shifting of the pilot valve control member 60' to the right (Figure 6) places the bore 88' in communication with the atmosphere through the space 96' and, consequently, effects the venting of air from the diaphragm side of valve 22' through the ports 110 and 112 of the interlocking valve 104 and through the line 92'. Thus the valve 22' is closed to block the flow of sewage therethrough from the intake pipe 26'.

Thus it is seen that the intake valve 22' is closed, the discharge valve 24' is open, and air pressure is directed to the upper portion of the receiver 16' to effect a discharge of the material in the receiver to the common outlet conduit 14.

In the event that the receiver 16 becomes filled while the receiver 16' is emptying, as just described, the upward movement of the bell 62 will, of course, shift the control member 60 to the left, as shown in Figure 5. This will effect a reversal of air pressure in the pipe line 94 and, consequently, in the pipe line 102. Accordingly, the condition illustrated in Figure 2 will again be established insofar as the interlocking valves 104 and 106 are concerned. However, since the pilot valve 58' is still in its "receiver emptying" position and there has been insufficient downward movement of the lower bell 64' to shift the control member 60', pressure air will continue to be directed through the pipe line 94'. This pressure air will be blocked by the plunger-closed port 120 and, consequently, the lines 98' and 56' will be vented to the atmosphere via the ports 118 and 122 of the valve 106. Thus the outlet valve 24' will move to its closed position and the plunger of the air control valve 32' will be moved to a position blocking the port 38' thereby preventing the entry of air pressure into the receiver 16' and venting the latter to the atmosphere through the pipe line 34', ports 46' and 42' of the air control valve 32', and into the exhaust line 44'.

In view of the foregoing, it will be seen that the pressure in the pipe line 86' will also be directed into the branch line 116 from which it will flow through the ports 114 and 110 of the valve 104 to the diaphragm of inlet valve 22'. Thus the inlet valve will be opened to allow entry of material into the receiver 16'.

Consequently, it is seen that in the described arrangement of duplex ejector units, with the interlocking valves in the pilot lines of the unit 12, the ejector unit 10 dominates the system. Simultaneous discharge of the units is prevented and yet the secondary unit 12 is permitted to fill while the dominating unit 10 is discharging.

Modification

Figures 7, 10:
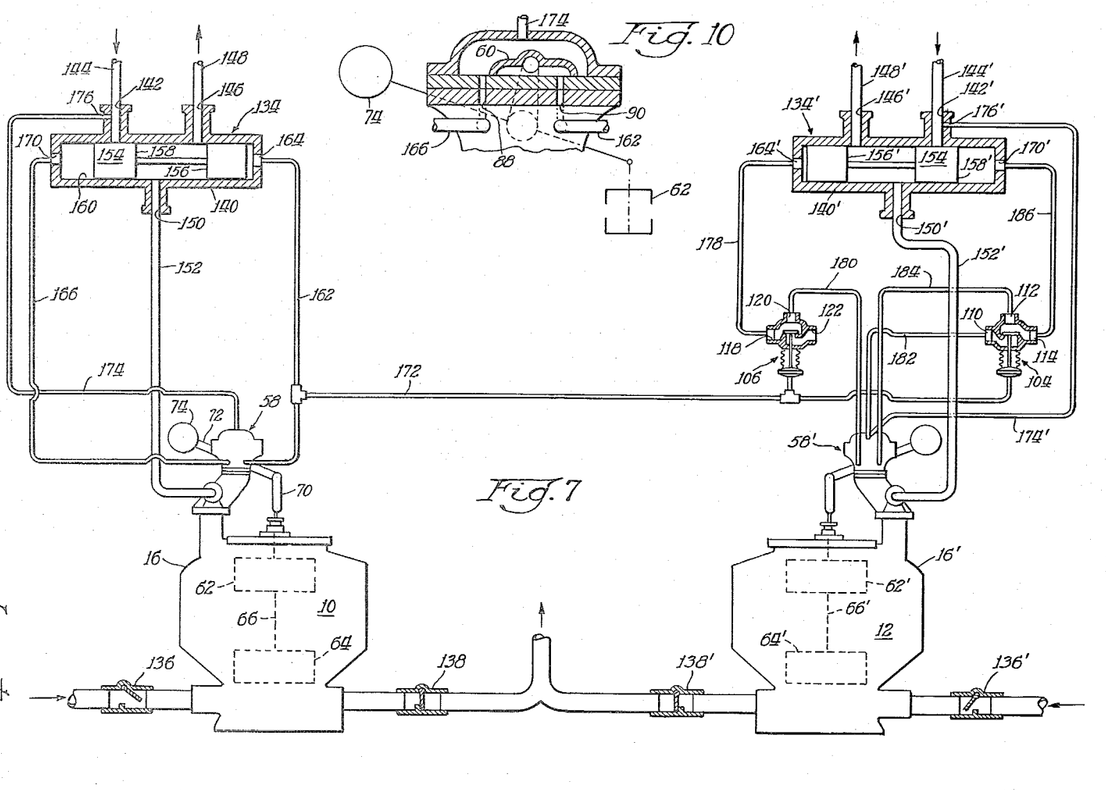
Figures 7, 8 and 9 are cross-sectional views of a duplex, pneumatic ejector unit which includes a modified form of automatic control system in accordance with the invention, the several views illustrating various operating positions of the control equipment.
Figure 10 is a cross-sectional view of the pilot valve as related to Figure 7.
Figure 8:
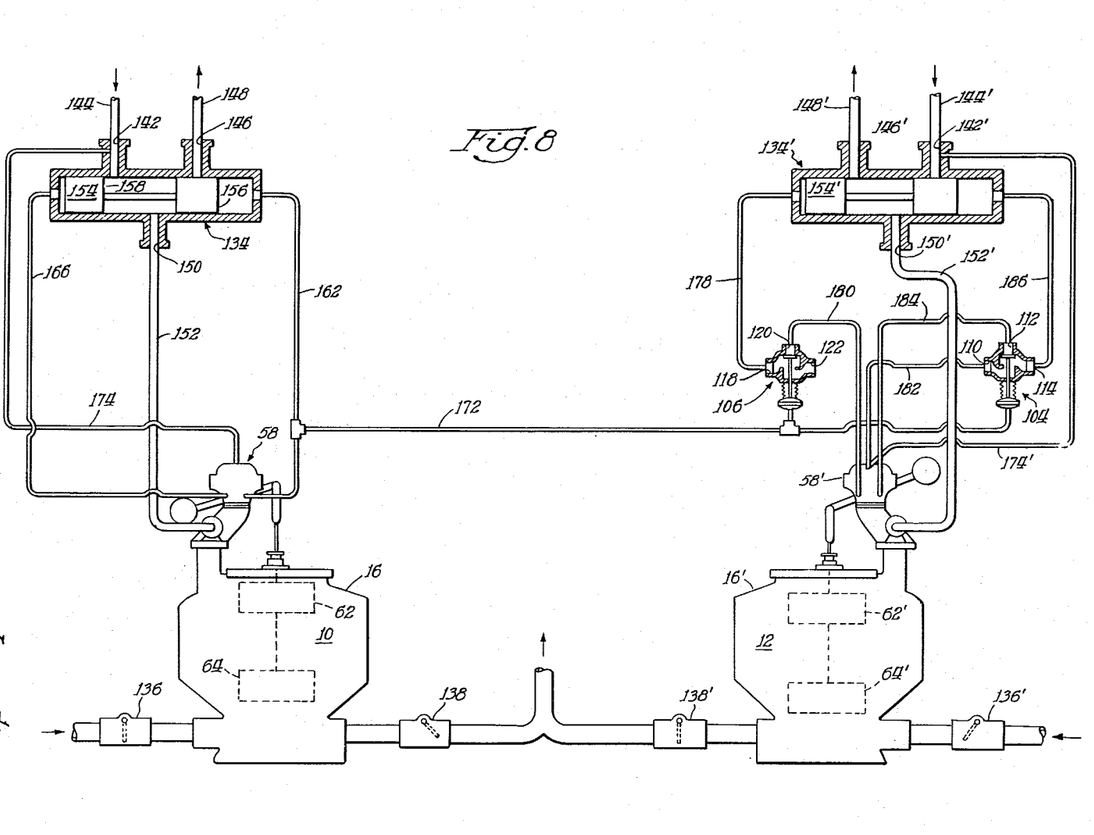
Figure 9:
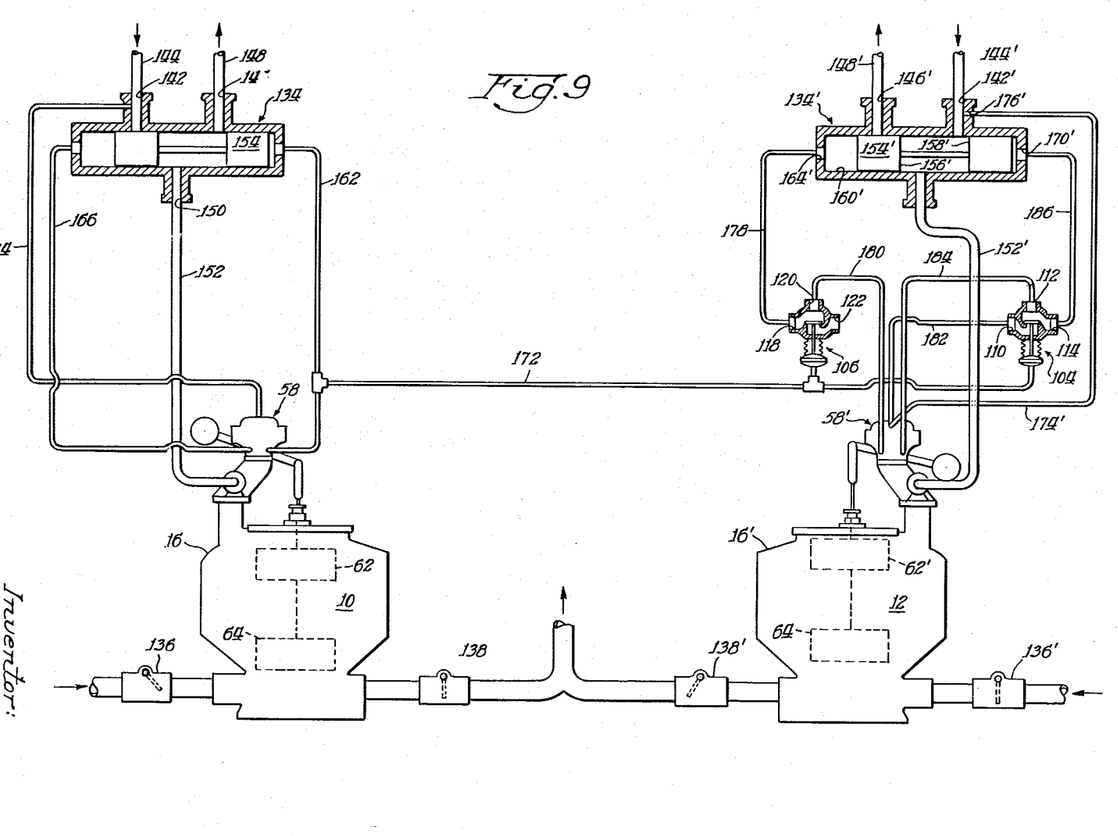

In Figures 7–9 there is illustrated a modified form of the present invention wherein the diaphragm-type air pressure control valves 32 and 32′ of the above described embodiment have been replaced by piston type valves 134 and 134′ of the design disclosed in my copending application Serial No. 118,544, referred to above, and the diaphragm-type sewage inlet and outlet valves have been replaced by ordinary one-way gate valves 136 and 138, 136′ and 138′, respectively. The ejector units are otherwise the same as those described above and the same numerals will, therefore, be used to designate the various parts thereof.

The piston valves 134 and 134′, which control the supply of air to the ejector units, are identical and, therefore, only the valve 134 will be described in detail. This valve includes a housing 140 having an air inlet port 142 which is connected to a source of pressure air by a pipe line 144, an exhaust port 146 which is connected to the atmosphere by an exhaust line 148, and a third port 150 which is connected to the receiver 16 by a pipe line 152.

The valve mechanism within the housing 140 includes a movable piston 154 comprising a pair of mechanically interconnected piston heads 156 and 158 which are slidably supported in a chamber 160 in the valve housing 140 and are movable to either of two operating positions. In one position (Figure 7) the piston head 158 closes the air inlet port 142 while the exhaust port 146 and port 150 are left open. In the second position of piston 154 (Figure 8) the piston 156 closes the air exhaust port 146 while the air inlet port 142 and port 150 remain open.

The action of the movable piston 154 is controlled by the pilot valve 58 which, as in the case of the previously described embodiment, is responsive to the liquid level in the receiver 16. The bore 90 in the pilot valve 58 communicates, through a pipe line 162, with a bore 164 in the end of the housing 140 containing the piston head 156. The bore 88 in the pilot valve 58 is in communication with a pipe line 166 which leads to a bore 170 in the end of the valve chamber 160 containing the piston head 158. The pipe line 162 is also connected with a pipe line 172 which leads to the diaphragm side of the pair of interlocking valves 104 and 106 associated with the ejector unit 12. The remaining bore 85 in the pilot valve housing is in communication with the air inlet port 142 of the piston valve 134 through a pipe 174 leading into a bore 176 adjacent the inlet port 142 of the valve 134.

The piston valve 134′ associated with the ejector unit 12 is identical to that just described and, accordingly, corresponding portions thereof will be designated by identical numerals with the symbol prime (′).

The interlocking valves 104 and 106 are identical with those shown in Figures 1–6 but are arranged differently in the system than those previously described because of the use of different type valves for controlling the pressure air and the flow of the sewage material. The bore 118 of the valve 106 is placed in communication with the bore 164′ at the left end of the piston valve 134′ by a pipe line 178. The bore 120 is in communication with the bore 90′ of the pilot valve 58′ through a pipe line 180, and the bore 122 of the valve 106 communicates directly with the atmosphere.

The interlocking valve 104 includes the port 110 which is in communication with the bore 85′ in the upper housing portion 82′ of the pilot valve 58′ by means of a pipe line 182. The same pilot valve bore 85′ is also in communication with the air inlet port 142′ of piston valve 134′ through the pipe 174′ and the bore 176′ adjacent the air inlet port 142′. The port 112 of the valve 104 communicates with the bore 88′ of control valve 58′ by means of a pipe line 184. The port 114 of the valve 104 communicates with the right hand end of piston valve 134′ through a pipe 186 and the bore 170′ in the piston valve housing.

With the described modification of the invention, the resulting operation of the duplex ejector units is very similar to that previously described with respect to Figures 1–6. Assuming that both of the receivers 16 and 16′ are empty, the bells 62 and 64, and 62′ and 64′ will be in their lowermost position, due to their own weight, and the pilot valves 58 and 58′ will be positioned to direct air pressure through the bores 88 and 88′ (Figure 10).

The air pressure entering the piston valves 134 and 134′ will flow through the ports 176 and 176′, respectively, and pass through the pipe lines 174 and 174′ into the chamber of the pilot valves 58 and 58′ where it will flow through the bores 88 and 88′ as indicated.

With respect to unit 10, the pressure air will flow from the bore 88 into the pipe line 166 from which it will enter the bore 170 in the left hand end of the piston valve 134 and move the piston 154 to the right, covering the air inlet port 142. The air displaced at the right end of the piston 154 will pass through the bore 164 into the line 162 from which it will pass through the bore 90 and space 96 of the pilot valve 58 to the atmosphere. Thus the exhaust port 146 of the piston valve 134 is open to permit the escape of air from the receiver 16 through the pipe line 152 and ports 150 and 146 into the exhaust line 148, as the air is displaced by the material flowing into the receiver through the sewage inlet valve 136.

Since the line 172 is vented to the atmosphere through the bore 90 in pilot valve 58, the diaphragms of the interlocking valves 104 and 106 will be in their normal positions with their respective plungers closing the ports 122 and 110. The pressure air entering the inlet port 142′ of the piston valve 134′ will flow from the bore 176′ into the pipe line 174′ to the chamber of the pilot valve 58′. From the pilot valve 58′ this pressure air flows through bore 88′ and line 184 into port 112 of the interlocking valve 104. The air leaves valve 104 via the port 114 and flows through the pipe line 186 into the right hand end of the valve 134′ to move piston 154′ to the left, opening the exhaust port 146′ and blocking the inlet port 142′. The chamber of the pilot valve 58′ is also in communication with the port 110 of the interlocking valve 104 through the line 182 but, since the port 110 is closed, there is no flow through valve 104 from this source.

The air displaced at the left end of chamber 160′ by the movement of the piston 154′ escapes through the port 164′, line 178, valve 106 and line 180 into the bore 90′ of the pilot valve where it passes to the atmosphere. Consequently, the receiver 16′ is vented through the line 152′ and ports 150′ and 146′ of the piston valve 134′ to the air exhaust line 148′, and the air displaced by the sewage entering the receiver 16′ escapes through this route. It should be noted that the sewage head in the inlet pipes will open the one-way inlet valves 136 and 136′, and that the outlet valves 138 and 138′ will remain closed in the absence of any additional pressure.

When the receiver 16 becomes filled, the upward movement of the bell 62 effects a shift of the control member 60 of the pilot valve to a position uncovering the bore 90 and covering the bore 88. As a result, the pressure air entering the pilot valve through the pipe 174 is now directed through the bore 90 and line 162 into the right end of the piston valve 134. This shifts the piston 154 to the left (Figure 8) closing the exhaust port 146 and opening the air inlet port 142. The air displaced at the left end of the valve 134 by the piston head 158 escapes through the line 166 and bore 88 of the pilot valve to the atmosphere. Pressure air is now directed through port 150 and line 152 into the receiver 16 to create a sufficient head of pressure to eject the material therein through the outlet valve 138.

Since the pipe line 172 is receiving air pressure at this stage of operation, the diaphragms of the interlocking valves 104 and 106 will be subject to pressure and, therefore, their respective plungers will be extended to close the ports 120 and 112. It will be noted, however, that this movement of the valve plungers will have no effect on the operation of the ejector unit 12. The pressure air previously delivered, via pipe line 184 through ports 112 and 114 into the pipe 186, to keep the piston 154' in its position uncovering exhaust port 146' is now delivered through the pipe line 182 and the port 110 of the interlocking valve 104 to flow into the line 186. Furthermore, the air displaced at the left end of the piston 154' is now vented directly to the atmosphere through the line 178 and the communicating ports 118 and 122 of the interlocking valve 106.

Thus the receiver 16' continues to be vented through the pipe 152' and the ports 150' and 146' to the exhaust line 148', to permit continued filling of the receiver.

Once the unit 10 has ejected the material in its receiver 16, there is a shift of the control member 60 of the pilot valve 58 back to its starting position (Figure 4). As shown in Figure 9, this results in the course of the pressure air entering inlet port 142 of the piston valve 134 to change and effect a shifting of the piston 154 to a position venting the receiver 16 to the exhaust line 148. The receiver 16, therefore, begins filling once more with the material entering the inlet valve 136.

There is also at this time a reversal of the flow of air through pipe 172 communicating with the interlocking valves 104 and 106. If the receiver 16' has not filled to cause a shifting of the control member 60', the condition illustrated in Figure 7 will exist and both receivers will continue filling.

However, assuming that the receiver 16' is full, the upward movement of the bells 62' and 64' will effect a shift of the control member 60' to cover the bore 88' and open communication between the air pressure line 174' and the bore 90'. As a result, the pressure air entering the inlet port 142' of the piston valve 134' will pass through the bore 176' into the pipe line 174' and then through the chamber 84' of the pilot valve into the bore 90'. From the bore 90' this air will flow through the line 180, through ports 120 and 118 of the interlocking valve 106 into the line 178, and then through the bore 164' into the piston valve chamber 160' to move the piston 154' to a position wherein the head 156' covers the exhaust port 146' and the inlet port 142' is open.

The air displaced at the right end of the chamber 160' by this movement of the piston 154' escapes through the bore 170' into the pipe line 186 from which it flows through the ports 114 and 112 of the interlocking valve 104 into the line 184. Since the line 184 is in communication with the inner space 96' of the pilot valve control member 60' through bore 88', the air is then exhausted to the atmosphere through the pilot valve 58'. The pressure air, flowing from the line 174', which enters the line 182 is, of course, blocked by the closed port 110 of the interlocking valve 104.

Consequently, it is seen that the invention described with respect to Figures 1–6 of the drawings is readily applicable to a system utilizing control valves other than the diaphragm type valves shown in the previously described embodiment.

There is provided, therefore, in the present invention a novel and improved control system for a multiple ejector installation, whereby a pair of interlocking valves in the lines controlled by the ejector pilot valves function automatically to permit either of the ejector units to fill while the other is discharging material therefrom. As indicated previously, the economical advantage in being able to utilize small valve structures for the interlocking valves is considerable, and is achieved through the present system of placing the interlocking valves in the pilot lines which are of small diameter pipe or flexible tubing. Further, the flexibility of placement of such valves and their connected tubing relative to the ejector units is an important factor in facilitating the installation of the system.

I claim:

1. In apparatus of the class described, a source of pressure air, a first and a second receiver, an intake conduit delivering material to be pumped to each of said receivers, an outlet conduit extending from each of said receivers, a valve in each of said intake and outlet conduits controlling fluid communication between the conduit and the associated receiver, an air conduit connecting each of said receivers to said source of air pressure and to the atmosphere, a first valve means in said air conduit for each of said receivers controlling pressure fluid communication between said receiver and said source of pressure air and the atmosphere, a second valve means for each of said receivers responsive to the level of material within the associated receiver, means connecting each of said first valve means with its associated second valve means for fluid flow therebetween in a manner affording control of the former by the latter, said connecting means for said first receiver including a pair of interlocking valves having fluid communication with said connecting means for said second receiver, said interlocking valves controlling the fluid communication between said first and second valve means for said first receiver, and said interlocking valves being responsive to pressure air supplied through said air conduit for said second receiver upon the discharge of the latter to shut off the supply of pressure air to said first receiver and condition the apparatus for said first receiver to receive material from said intake conduit.

2. In apparatus of the class described, a source of pressure air, a first and a second receiver, an intake conduit delivering the material to be pumped to each of said receivers, an outlet conduit extending from each of said receivers, a valve in each of said intake and outlet conduits controlling communication between the conduit and the associated receiver, an air conduit connecting each of said receivers to said source of pressure air and to the atmosphere, a first valve means in said air conduit for each of said receivers controlling the flow of pressure fluid between said receiver and said source of pressure air and the atmosphere, a second valve means for each of said receivers responsive to the level of material within the associated receiver to effect movement of said first valve means to alternately supply air to that receiver to discharge the contents thereof and to vent air contained in that receiver so that material from said intake conduit can enter the receiver, and an interlocking valve means controlling the flow of fluid between the first and second valve means of said first receiver and responsive to the action of said second valve means for said second receiver to vent said first receiver and permit same to fill while said second receiver is discharging.

3. In apparatus of the class described, a source of pressure air, a first and a second receiver, an intake conduit delivering the material to be pumped to each of said receivers, an outlet conduit extending from each of said receivers, a valve in each of said intake and outlet conduits controlling communication between the conduit and the associated receiver, an air conduit connecting each of said receivers to said source of pressure air and to the atmosphere, a first valve means in said air conduit for each of said receivers controlling communication between said receiver and said source of pressure air and the atmosphere, a second valve means for each of said receivers which is responsive to the level of material within the associated receiver, means introducing pressure air into said second valve means, additional means placing each of said first valve means in communication with its associated second valve means for control of the former by the pressure air flowing into the latter, said additional means for said first receiver including a pair of interlocking valves which are connected with said second valve means for said second receiver for fluid flow therebetween and for movement in response to the flow of air through said second valve means, at least one of said interlocking valves controlling the action of said first valve means for said first receiver during the discharge of said second receiver to shut off the supply of pressure air to said first receiver and to vent said first receiver to the atmosphere.

4. In apparatus of the class described, a source of pressure air, a first and a second receiver, an intake conduit delivering the material to be pumped to each of said receivers, an outlet conduit extending from each of said receivers, an air conduit connecting each of said receivers to said source of pressure air and to the atmosphere, a first valve means for each of said receivers controlling communication of said air conduit with said source of pressure air and with the atmosphere, a second valve means for each of said receivers having fluid communication with said first valve means for the associated receiver and responsive to the level of material within the associated receiver to move said first valve means to alternately supply air to that receiver to discharge the contents thereof and to vent air contained in that receiver, a discharge control valve in each of said outlet conduits, an intake control valve in each of said intake conduits, means connecting each of said intake and discharge control valves with the associated second valve means, and a pair of interlocking valves for said first receiver controlling communication between said first valve means and said second valve means and between said second valve means and said discharge and intake control valves for said first receiver, said interlocking valves having fluid communication with said second valve means for said second receiver for response to pressure air supplied through said air conduit for said second receiver during the discharge of the latter to simultaneously vent said first receiver and to open the intake control valve associated therewith to permit said first receiver to receive material flowing through said intake conduit.

5. In apparatus of the class described, a source of pressure air, a first and a second receiver, an intake conduit delivering the material to be pumped to each of said receivers, an outlet conduit extending from each of said receivers, an air conduit connecting each of said receivers to said source of pressure air and to the atmosphere, a first valve means in said air conduit for each of said receivers controlling communication between said receiver and said source of pressure air and the atmosphere, a second valve means for each of said receivers repsonsive to the level of material within the associated receiver, a pressure operated discharge control valve in each of said outlet conduits, a pressure operated intake control valve in each of said intake means, means introducing pressure air into said second valve means, additional means placing each of said first valve means in fluid communication with its associated second valve means and with the associated pressure operated intake and discharge control valves, said additional means for said first receiver including a pair of interlocking valves, conduit means placing said interlocking valves in fluid communication with said second valve means for the second receiver for response to the flow of air therethrough, said interlocking valves controlling the flow of pressure fluid through said additional means to thereby regulate the action of said first valve means, said discharge valve, and said intake valve for said first receiver to automatically permit the delivery of pressure air to said first receiver and open the discharge valve thereof when said second receiver is filling and said first receiver becomes filled, and to vent said first receiver and open the intake valve thereof when said second receiver is discharging.

6. In apparatus of the class described, a source of pressure air, a first and a second receiver, an intake conduit delivering the material to be pumped to each of said receivers, an outlet conduit extending from each of said receivers, a pressure responsive valve in each of said intake and outlet conduits controlling fluid communication between the conduit and the associated receiver, a relatively large air conduit connecting each of said receivers to said source of air pressure and to the atmosphere, a first valve means in said air conduit for each of said receivers controlling fluid communication between said receiver and said source of pressure air and the atmosphere, a second valve means for each of said receivers repsonsive to the level of material within the associated receiver, fluid flow means comprising relatively small conduits placing each of said first valve means in fluid communication with its associated second valve means for control of the former by the latter, said fluid flow means for said first receiver further comprising a pair of interlocking valves controlling the fluid communication between said first and second valve means for said first receiver, said interlocking valves having fluid communication with said second receiver and responsive to pressure air supplied to said second receiver during the discharge thereof to shut off the supply of air into said first receiver and vent said first receiver to allow the receiver to receive material flowing through said intake conduit.

7. In apparatus of the class described, a source of pressure air, a first and a second receiver, an intake conduit delivering the material to be pumped to each of said receivers, an outlet conduit extending from each of said receivers, an air conduit connecting each of said receivers to said source of pressure air and to the atmosphere, a first valve means in said air conduit for each of said receivers controlling fluid communication between said receiver and said source of pressure air and the atmosphere, a second valve means for each of said receivers responsive to the level of material within the associated receiver, a pressure operated discharge control valve in each of said outlet conduits, a pressure operated intake control valve in each of said intake means, additional means comprising pilot lines relatively smaller than said air conduit placing each of said first valve means in fluid communication with its associated second valve means and with the associated pressure operated intake and discharge control valves, said additional means for said first receiver further comprising a pair of interlocking valves in fluid communication with said second valve means of said second receiver for operation in response to the flow of air through said second valve means, said interlocking valves being disposed in said pilot lines and being operable to direct the passage of fluid therethrough to control the action of said first valve means, said discharge valve, and said intake valve for said first receiver so that pressure air is delivered to said first receiver from said source and said discharge valve is open when said second receiver is filling and said first receiver has become filled, and so that said first receiver is vented to atmosphere through said air conduit and said intake valve for said first receiver is open when said second receiver is discharging.

8. In apparatus of the class described, a source of pressure air, a first and a second receiver, intake means connected to each of said receivers for delivery thereto of the material to be pumped, an intake control valve in each of said intake means, an outlet conduit extending from each of said receivers, a discharge control valve in each of said outlet conduits, an air conduit connecting each of said receivers to said source of pressure air and to the atmosphere, a fluid pressure control system for said receivers including a control valve means for controlling the fluid flow in each of said air conduits, each of said control valve means having a control element which is connected with the associated receiver for movement in response to the change in the level of material within said associated receiver, whereby movement of said control element operates the associated control valve means to alternately supply air to the associated receiver to discharge the contents thereof and to vent air contained in that receiver to the atmosphere to permit said receiver to receive material through said intake means, said fluid pressure control system also including an interlocking valve means in fluid communication with said control valve means for said first receiver and with the associated discharge control valve and intake control valve, said interlocking valve means having fluid communication with said control valve means for said second receiver for response to pressure air supplied through said air conduit to said second receiver during the discharge thereof to prevent the supply of pressure air to said first receiver, to vent said first receiver, to close the discharge control valve for said first receiver, and to open said intake control valve for said first receiver.

9. In apparatus of the class described, a source of pressure air, a first and a second receiver, an intake conduit delivering material to be pumped to each of said receivers, an outlet conduit extending from each of said receivers, a valve in each of said intake conduits controlling fluid communication between the conduit and the associated receiver, an air conduit connecting each of said receivers to said source of air pressure and to the atmosphere, a first valve means in said air conduit for each of said receivers controlling pressure fluid communication between said receiver and said source of pressure air and the atmosphere, a second valve means for each of said receivers responsive to the level of material within the associated receiver, means connecting each of said first valve means with its associated second valve means for fluid flow therebetween in a manner affording control of the former by the latter, said connecting means for said first receiver including a pair of interlocking valves having fluid communication with said connecting means for said second receiver, said interlocking valves controlling the fluid communication between said first and second valve means for said first receiver, and said interlocking valves being responsive to pressure air supplied through said air conduit for said second receiver upon the discharge of the latter to shut off the supply of pressure air to said first receiver and condition the apparatus for said first receiver to receive material from said intake conduit.

10. In apparatus of the class described, a source of pressure air, a first and a second receiver, an intake conduit delivering the material to be pumped to each of said receivers, means for preventing the back flow of material from said receiver through said intake conduit, an outlet conduit extending from each of said receivers, an air conduit connecting each of said receivers to said source of pressure air and to the atmosphere, a first valve means in said air conduit for each of said receivers controlling the flow of pressure fluid between said receiver and said source of pressure air and the atmosphere, a second valve means for each of said receivers responsive to the level of material within the associated receiver to effect movement of said first valve means to alternately supply air to that receiver to discharge the contents thereof and to vent air contained in that receiver so that material from said intake conduit can enter the receiver, and an interlocking valve means controlling the flow of fluid between the first and second valve means of said first receiver and responsive to the action of said second valve means for said second receiver to vent said first receiver and permit same to fill while said second receiver is discharging.

References Cited in the file of this patent

UNITED STATES PATENTS

| | | |
|---|---|---|
| 1,628,608 | Newhouse | May 10, 1927 |
| 2,362,802 | Ciabattari | Nov. 14, 1944 |

FOREIGN PATENTS

| | | |
|---|---|---|
| 103,908 | Germany | July 30, 1897 |